March 28, 1939  I. B. HOLTZ  2,152,409
TWO-SPEED DIFFERENTIAL
Filed Oct. 7, 1937
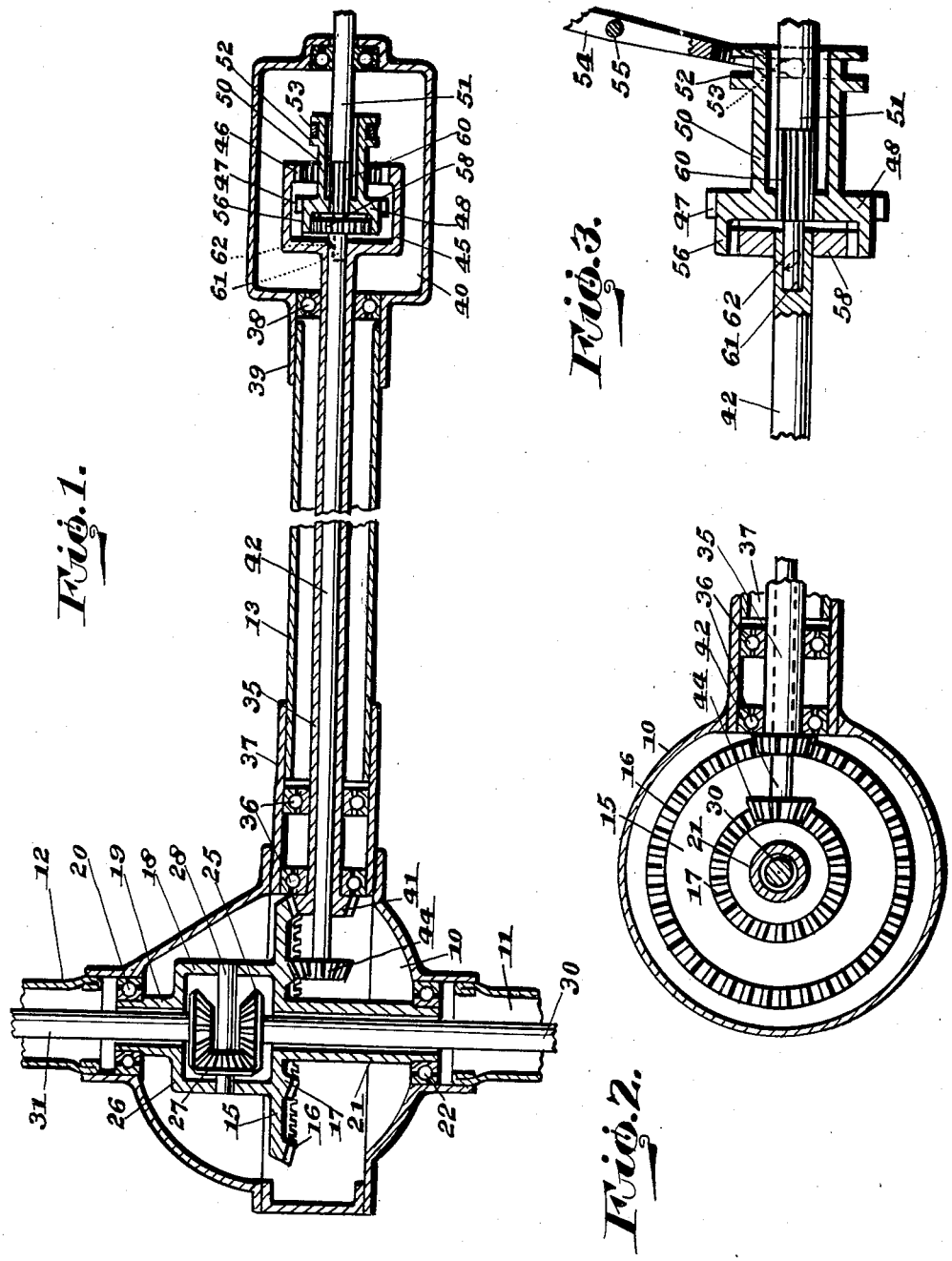
INVENTOR
I. Basil Holtz
Munn, Anderson & Liddy
ATTORNEY Patented Mar. 28, 1939

2,152,409

UNITED STATES PATENT OFFICE 2,152,409

TWO-SPEED DIFFERENTIAL

Irenaeus Basil Holtz, Ashville, Pa.

Application October 7, 1937, Serial No. 167,846

1 Claim. (Cl. 74—326)

This invention relates to a two-speed differential.

An object of the invention is the provision of a differential which has the usual drive for the wheels of a vehicle but which also includes a high speed drive whereby the automobile may be driven along the level at a greater speed without racing the engine for the purpose.

Another object of the invention is the provision of a differential for an automobile in which a normal speed drive is supplemented by a high speed drive so that when the high speed is employed on the level the automobile may be driven at greater speed without racing the engine and thereby conserving fuel, a clutch mechanism being employed for alternately throwing in one drive while releasing the other.

A further object of the invention is the provision of a two-speed differential in which the usual drive shaft for an automobile is made hollow to receive a shaft having a gear thereon which meshes with a supplemental ring gear in the differential which has less diameter than the usual ring gear so that when the axles of the vehicle are driven by a ring gear of lesser diameter the automobile will be driven at greater speeds along level roadbeds without the necessity of racing the engine.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a fragmentary horizontal section of the drive shaft housing and a differential of an automobile constructed in accordance with the principles of my invention, Figure 2 is a fragmentary vertical section of the differential, and Figure 3 is an enlarged fragmentary vertical section of a clutch employed in connection with the differential.

Referring more particularly to the drawing, 10 designates a differential housing to which are connected axle housings 11 and 12 and a drive shaft housing 13.

A disc 15 is located in the differential housing 10 and is provided with a ring gear 16 and a ring gear 17 of lesser diameter than the ring gear 16. A spider casing 18 is connected to the disc 15 and has a hollow shaft 19 mounted in bearings 20. A hollow shaft 21 extends from the disc 15 and is mounted in bearings 22. The hollow shafts 19 and 21 provide a support for the disc 15, ring gears 16 and 17 and spider casing 18.

The usual gears 25, 26 and 27 are located within the casing 18. The gear 27 is carried by the shaft 28 which in turn is supported by the spider casing 18. Gear 25 is connected to the inner end of an axle 30 while gear 26 is connected to the inner end of an axle 31. The differential is substantially the same as the usual type found in automobiles and the various elements of the differential are supported by standard equipment.

A hollow shaft 35 is located within bearings 36 mounted in a sleeve 37 which connects the housing 13 with the differential housing 10. The shaft 35 is supported at its inner end by bearings 38 carried by a sleeve 39 projecting from a clutch housing 40. A gear 41 is secured to the outer end of the hollow shaft 35 and this gear meshes with the ring gear 16.

A solid shaft 42 is located within the hollow shaft 35 and has its outer end projecting into the housing 10 where a gear 44 meshing with the ring gear 17 is rigidly secured to said shaft.

A clutch element 45 is located within the housing 40 and is either formed integrally with the inner end of the hollow shaft 35 or connected to the same in any approved manner. This element is in the shape of a drum and has its inner end provided with an opening to mesh with teeth 47 on a disc 48. The disc is normally located within the hollow clutch element 45.

From one face of the disc 48 projects a sleeve 50 which embraces the rear end of a drive shaft 51 which is connected with the usual transmission of the vehicle. The forward end of the sleeve is provided with a flange 52 which is engaged by a fork 53 on an end of a lever 54 which is pivoted at 55 to the housing 40. The lever 54 may be connected to a second lever (not shown) which extends into the automobile adjacent the operator of the car or the free end of the lever 54 may project through the floor of the automobile.

The opposite face of the disc 48 is provided with an annular flange 56 having teeth at its inner face and forming a clutch which is adapted to engage teeth 57 formed at the periphery of a disc 58 which is secured to the forward end of the shaft 42.

The rear end of the drive shaft 51, as shown at 60, is provided with splines adapted to be received by grooves formed at the periphery of a central opening in the disc 48 so that the shaft 51 will rotate the disc 48 and the various elements connected thereto. The extreme rear end of the shaft 51 is reduced, as shown at 61, and is adapted to be received by an axial passage 62 in the forward end of the shaft 42.

The operation of my device is as follows: During the normal operation of the automobile the lever 54 will have been moved to a position where the teeth 47 on the disc 48 will be in engagement with the clutch 46 so that the disc 15 and the ring gear 16 will be revolved by the gear 41 and the hollow shaft 35.

When a level stretch of road has been reached and the engine is in "high" the operator of the car will move the lever in the opposite direction so that the teeth 47 will be moved away from the teeth of the clutch 46 until the teeth on the flange 56 engage the teeth 57 on the disc 58. Since the gear on the disc 58 is rigidly secured to the shaft 42 this shaft will be revolved and cause the gear 17 to revolve the disc or plate 15 so that the plate will be revolved at a greater speed than when it was revolved by the gears 41 and 16.

When the operator desires to resume the normal running of the car it is only necessary to move the lever 54 in an opposite direction for causing the sleeve 50 to be shifted forwardly as will be the disc 48 until the teeth 47 of said disc align with the teeth 46 on the casing 45.

It will be appreciated that bearings where necessary will be employed other than those shown and also universal joints may be utilized which will be suitable for different types of drive shafts.

Different types of clutch mechanisms may be substituted for the type shown herein.

I claim:

In a vehicle differential provided with a main housing and a spider casing, the combination of a disc connected with the casing and having ring gears of different diameters thereon, an elongated shaft housing extending from the main housing, an auxiliary housing connected to the outer free end of the shaft housing, a hollow shaft in the elongated housing and having its opposite ends extended into the main and auxiliary housings, a gear fixed to one end of the shaft and meshing with the ring gear of larger diameter, a clutch element on the other end of the shaft, a second shaft received by the first shaft, a gear on one end of the second shaft and meshing with the other ring gear, a clutch element on the other end of the second shaft and housed by the first clutch element, a drive shaft having one end projecting into the auxiliary housing, a third clutch element within the first clutch element and slidably keyed to the drive shaft, and means for moving the third clutch element into operative engagement alternately with the first and second clutch elements.

IRENAEUS BASIL HOLTZ.